Dec. 1, 1964  K. E. CLAUSEN  3,158,881
FRONT TRAILER WHEEL ARRANGEMENT
Filed April 17, 1962  2 Sheets-Sheet 1
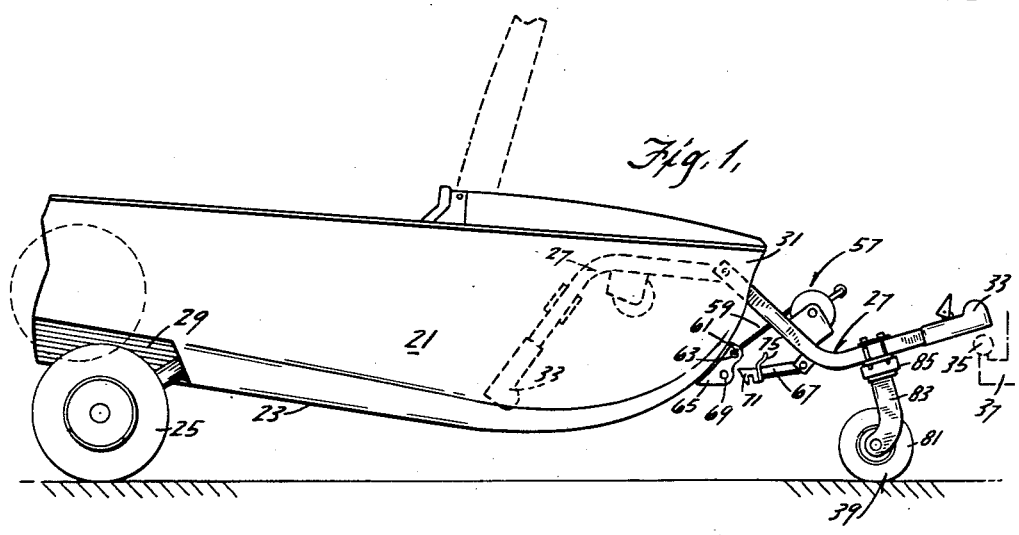
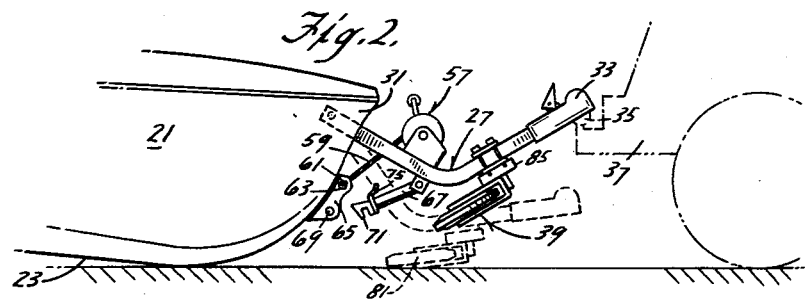
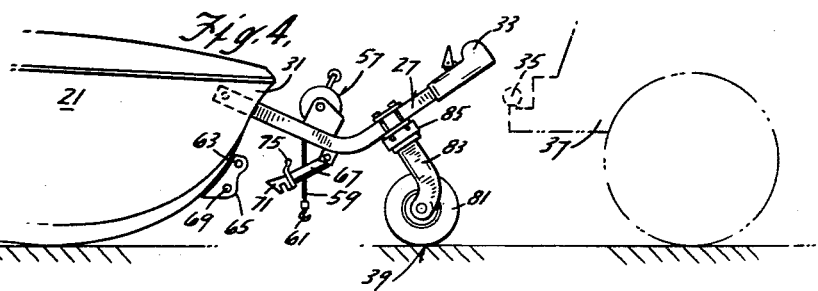
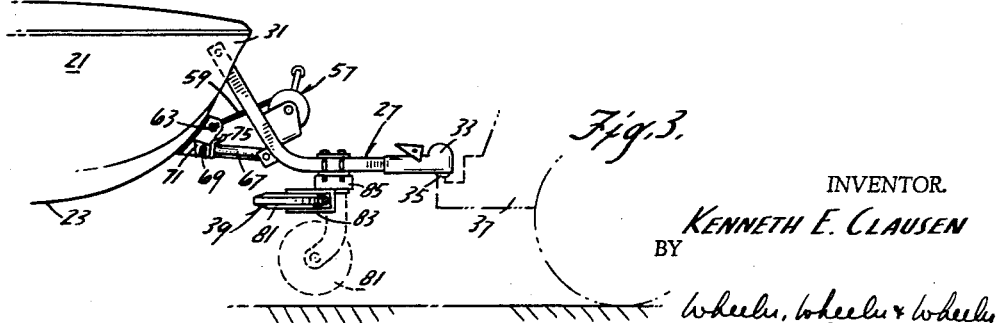
INVENTOR.
KENNETH E. CLAUSEN
BY
Wheeler, Wheeler & Wheeler
ATTORNEYS Dec. 1, 1964      K. E. CLAUSEN      3,158,881
FRONT TRAILER WHEEL ARRANGEMENT
Filed April 17, 1962      2 Sheets-Sheet 2
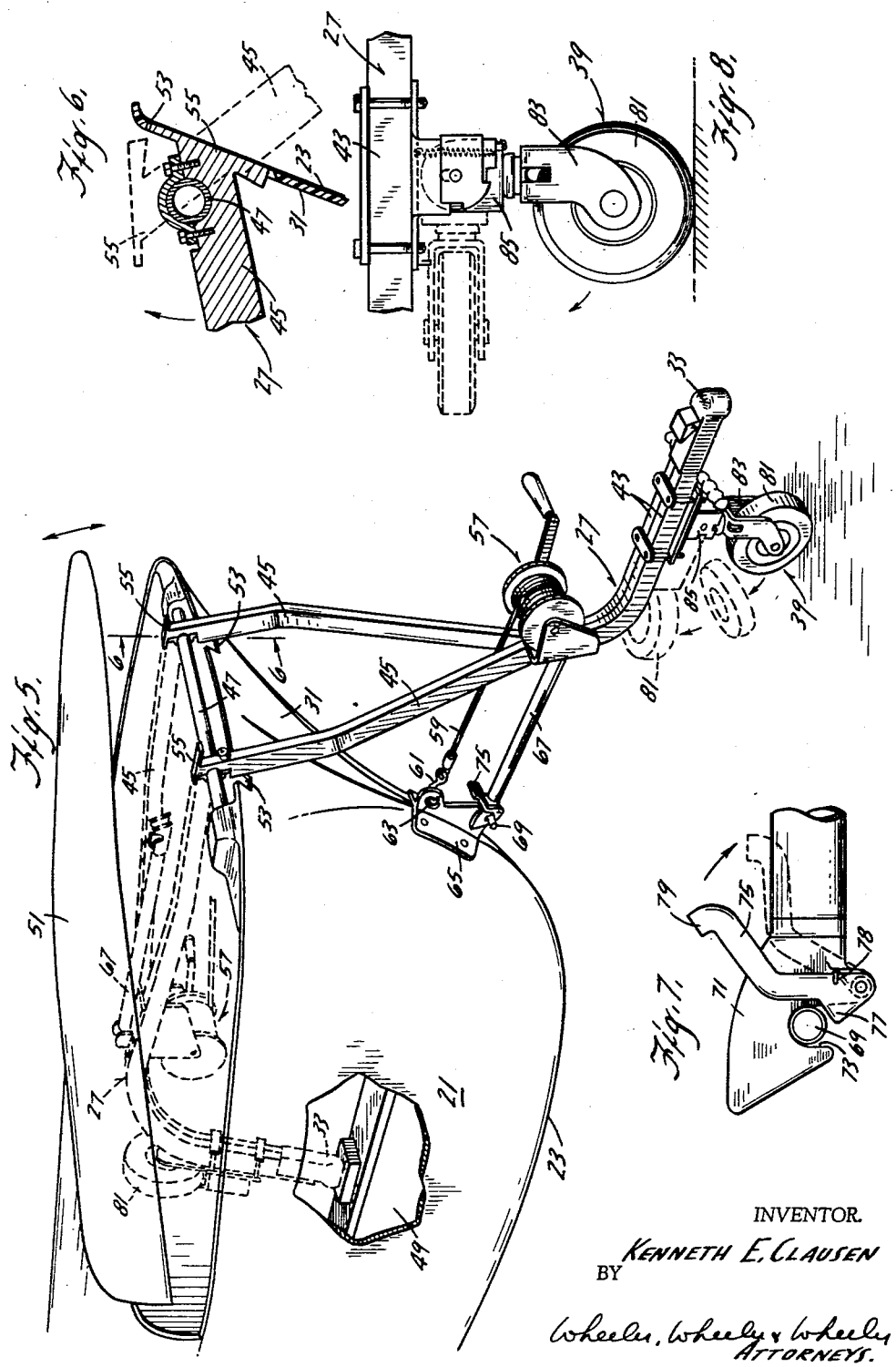
INVENTOR.
KENNETH E. CLAUSEN
BY
Wheeler, Wheeler & Wheeler
ATTORNEYS.

United States Patent Office 3,158,881
Patented Dec. 1, 1964

3,158,881
FRONT TRAILER WHEEL ARRANGEMENT
Kenneth E. Clausen, Waukegan, Ill., assignor to Outboard Marine Corporation, Waukegan, Ill., a corporation of Delaware
Filed Apr. 17, 1962, Ser. No. 188,102
14 Claims. (Cl. 9—1)

The invention relates generally to arrangements selectively facilitating coupling of a first vehicle or trailer in trailing relation to a second vehicle, or disposition of said first vehicle in a parked condition, with the bed or frame of the first vehicle in raised relation to a supporting surface, such as the ground. More particularly, the invention also relates to trailers which are supported, at least in part, by wheel means mounted on the frame or bed thereof in such manner as to provide for tilting of the frame or bed relative to the ground. The invention also specifically relates to, but is not limited to, boats having hulls incorporating supporting wheel means and coupling means which afford trailing of the boat behind a towing vehicle.

The invention is directed to, and has for one principal object, an arrangement for tilting the frame of a trailer to raise one end thereof from a position of resting engagement with the ground, thereby selectively facilitating disposition of the trailer in parked condition with the frame in raised relation to the ground, or coupling of the trailer to a towing vehicle with the frame in elevated relation to the ground.

The advantages of the invention are achieved, at least in part, by the mounting on the trailer of a hitch bar having means for supporting the outer end thereof in spaced relation to the ground, together with means affording vertical displacement of the outer end of the hitch bar relative to the adjacent part of the trailer. As disclosed, the means for supporting the outer end of the hitch bar in raised relation to the ground includes a coupling element adapted to be connected to a complementary coupling component carried at a predetermined level above the ground on a towing vehicle, and a parking wheel which is displaceable between a first position adapted for engagement with the ground so as to locate the other end of the hitch bar in elevated relation, and a second, inoperative or retracted storage position preferably in parallel relation to the hitch bar. As disclosed, the means for varying the vertical distance between the outer end of the hitch bar and the adjacent part of the trailer includes a winch or other means providing a suitable mechanical advantage.

The invention also contemplates employment of a strut or tow bar which is releasably connectable between the trailer and the hitch bar when the outer end of the hitch bar is at a given vertical disposition relative to the mounting of the hitch bar, thereby fixing the relation between the hitch bar and the trailer and permitting release of any load on the winch when the trailer is parked or disposed in trailing, coupled attachment, to a towing vehicle. Although the invention is applicable to a wide range of trailers, in the preferred form, the invention is incorporated in a boat which is adapted to be trailed behind a towing vehicle.

In the case of a boat, the invention also contemplates mounting of the hitch bar to the hull to afford displacement of the hitch bar from a retracted storage position within a storage locker under the upper front deck, to a range of forwardly extending positions wherein the hitch bar is positionable for attachment to a towing vehicle or for support by the parking wheel.

In the preferred embodiment, the hitch bar is pivotally mounted on the boat hull for movement through a vertical arc, and the winch means is operable to swing the hitch bar around its pivotal mounting to a given angular relation with the hull, thereby elevating the connected part of the hull when the outer end of the hitch bar is held at a predetermined height above the ground, and thereby permitting attachment of the strut which serves to retain the hitch bar and hull in said given angular relation.

Other objects and advantages of the invention will be apparent by reference to the following description and the accompanying drawings of one embodiment of the invention in which:

FIGURE 1 is an elevational view of a boat hull embodying various of the features of the invention, showing the boat hull in parked condition in full lines with the hitch bar, parking wheels, and rearward wheels in their extended position, and showing in dotted lines, the disposition of the rearward wheels and hitch bar when in their retracted positions;

FIGURE 2 is a fragmentary view of a portion of the boat illustrated in FIGURE 1, showing in full lines the position of the hitch bar when the hitch bar is initially engaged with the towing vehicle and showing, in dotted lines, the hitch bar resting on the ground when the bow of the boat is resting on the ground or floating in the water;

FIGURE 3 is a view similar to FIGURE 2 showing the boat in trailing, coupled attachment to a towing vehicle;

FIGURE 4 is a fragmentary view similar to FIGURE 3 showing the position of the hitch bar when the parking wheel is disposed in its downwardly extending position in engagement with the ground, and when the bow of the boat is resting on the ground or floating on water;

FIGURE 5 is an enlarged and partially broken away perspective view of the bow of the boat shown in FIGURE with the hitch bar in bow-supporting relation to the hull;

FIGURE 6 is an enlarged view taken generally along line 6—6 of FIGURE 5;

FIGURE 7 is an enlarged view of the latch connecting the strut to the hull; and

FIGURE 8 is an enlarged elevational view of the mounting of the parking wheel on the hitch bar.

For purposes of illustration, the invention has been shown embodied in a boat 21 including a hull 23 incorporating a pair of generally rearwardly disposed wheels 25 and a hitch bar 27. The rear wheels 25 are mounted on the hull 23 to afford movement relative thereto between downwardly extended positions adapted for tiltably supporting the hull in raised relation to the supporting surface or ground, and retracted positions within suitable wells or recesses 29 in the hull 23, thereby facilitating travel of the boat 21 through the water. Any suitable means can be employed to displace the rear wheels 25 between their extended and retracted positions. When the rear wheels are in their extended position, the hull 23 is tiltable relative to the ground and is normally disposed with the bow 31 resting on the ground.

The bow 31 can be elevated with respect to the ground by tilting the hull 23 about the rear wheels by means including the before-mentioned hitch bar 27 and its related components. More specifically, the hitch bar 27 is mounted to the bow 31 to afford movement of its outer or forward end relative to the bow and includes, adjacent its outer end, means for support thereof in raised or elevated relation to the ground. This last mentioned means comprises a coupling element 33, of conventional construction, adapted to be releasably connected to a mating coupling component 35 located at a predetermined height above the ground on a towing vehicle 37, and a support member or parking wheel 39 which is mounted on the hitch bar 27 inwardly of the coupling element 33. As will be described, the parking wheel 39 is mounted by means providing for selective disposition of the parking wheel relative to the hitch bar, between a downwardly extended position, and a retracted or folded position in parallel relation to the adjacent portion of the hitch bar.

Still more specifically, the hitch bar 27 comprises the assembly of a pair of bent structural members, each including forward and rearward legs 43 and 45 respectively. The rearward legs 45 diverge horizontally and are fixedly secured, at their rearward ends, to a horizontally disposed pivot tube 47, mounted in journals provided in the bow 31 of the hull, whereby the hitch bar 27 is mounted for vertical swinging movement between a range of forwardly extending positions and a retracted position. As can be seen in FIGURE 5, the hull 23 includes a chamber or locker 49 in the bow for receiving the hitch bar when in its retracted position. The locker 49 is closable by a removable hatch 51 which, when secured to the remainder of the hull in enclosing relation to the locker, forms a portion of the upper or top deck of the boat in the bow area. As can also be seen in FIGURE 5, the hull includes two vertical slots 53 through which the rearward legs 45 are movable when the hitch bar 27 is forwardly disposed. As seen especially in FIGURE 6, these slots 53 are closed when the hitch bar 27 is in its retracted position by transverse plates 55 fixed respectively to the ends of the rearward legs 45, which plates 55 have outer surfaces generally conforming to the outer surrounding contour of the bow.

The forward legs 43 of the structural members 41 are bent at a vertical angle with respect to the rearward legs 45 and, at their forward ends, support the before-mentioned coupling element 33.

In accordance with the invention, means are provided for connecting a point on the hitch bar spaced from the pivot tube 47 and a point on the hull 23 below the pivot tube 47 and for adjustably varying the distance between the connected points, and thereby vertically displacing the free end of the hitch bar relative to the hull. While various arrangements can be employed for swinging the hitch bar 27 relative to the hull 23 so as to vary the vertical displacement of the forward end of the forward legs 43 relative to the pivot tube 47, the disclosed arrangement incorporates a hand-operated winch 57 of conventional construction. The winch 57 is mounted on the hitch bar 27 at a point just above the point of horizontal separation of the rearwardly extending legs 45 and includes a flexible line or cable 59. At its outer end, the cable 59 includes a hook 61 which is engageable with an eye 63 on a fitting 65 secured to the bow 31 at a point below the pivot tube 47. Thus, by reeling in the cable 59, the hitch bar 27 can be swung clockwise, as seen in FIGURES 1 through 5, whereby the vertical displacement between the forward end of the legs 43 relative to the pivot tube 47 is increased. As can be seen from examination of FIGURES 1 through 4, clockwise swinging of the hitch bar 27 around its mounting, when the parking wheel 35 is in its downwardly extended position or when the coupling element is secured to the coupling component 35 on the towing vehicle 37, serves to elevate the bow 31 of the boat 21.

The hitch bar 27 can be releasably retained in fixed relation to the hull 23 by a brace element or strut 67 when the bow and the hitch bar are in predetermined angular relation such that the bow is elevated above the ground when the forward end of the hitch bar 27 is supported above the ground. More particularly, the strut 67 comprises a two-force member which is pivotally mounted at one end to the hitch bar 27 adjacent the vertical bend and which, at its other or rearward end, includes latch means releasably engageable with the hull. Preferably, the strut extends in a generally parallel relation to the cable when attached between the hull and the hitch bar.

Various arrangements can be employed for releasably latching the rearward end of the strut 67 to the hull 23. In the disclosed construction, a transversely extending bar or pin 69 is mounted on the fitting 65, and the rearward end of the strut includes a latch member 71 including a downwardly open notch 73 into which the bar 69 is receivable. Mounted on the latch member is a latch lever 75 having a bolt portion 77 which is positionable to prevent displacement of the bar 69 from the notch 73 by a biasing spring 78 (see FIGURE 7). The latch lever 75 also includes a handle or grip 79 which can be utilized to rock the latch lever 75 against the action of the spring in a clockwise direction, as seen in FIGURE 7, to permit disengagement of the latch member 71 from the bar 69.

The parking wheel 39 comprises a caster wheel 81 supported on a frame 83 pivotally mounted about a horizontal axis to a depending support bracket 85 on the forward legs 43 of the hitch bar 27. Suitable releasable means are provided for retaining the frame 83 in position to locate the caster wheel 81 in downwardly extending position or to retain the caster wheel in folded position under, and in parallel adjacent relation to, the forward legs 43 of the hitch bar 27. If desired, a simple support post can be employed rather than the parking wheel. However, the lower end of such a post is preferably rounded to facilitate rocking of the post relative to the ground during swinging of the hitch bar into position for engagement of the strut with the bow.

In operation, assuming the bow 31 of the boat 21 is beached on the shoreline with the rear wheels in their downwardly extended position, the hitch bar 27 may be swung from its storage locker 49 into a position of resting engagement on the beach. If a towing vehicle is immediately available, the hitch bar may be simply raised by hand in a position to be lowered onto the coupling component. The hook 61 on the end of the cable 59 is then secured to the eye 63 on the bow fitting 65 and the winch 57 is operated to swing the hitch bar 27 clockwise, as seen in FIGURES 1 through 5. Such movement serves, in view of the support of the coupling element 33 by the coupling component 35 at a generally predetermined height above the ground, to elevate the bow 31 and permit fixing of the strut between the hitch bar 27 and the hull 23. After attaching the strut 67, the load on the winch 57 can be released and the boat 21 towed away.

When it is desired to position the boat 21 in its parked condition from a position with the rear wheels 25 extended and with the bow 31 resting on the ground, the hitch bar 27 is swung forwardly and the parking wheel 39 is disposed in its extended position in engagement with the ground. The hook 61 on the end of the cable 59 is then attached to the bow 31 and the winch 57 is operated to swing the hitch bar 27 clockwise, as seen in FIGURES 1 through 5, until the strut 67 can be secured between the hitch bar 27 and the hull 23. As can be seen from FIGURE 4, the parking wheel serves initially to elevate the forward end of the hitch bar 27. As the hitch bar 27 is swung clockwise, the parking wheel 39 pivots clockwise until it assumes a generally vertical position when the hitch bar 27 is positioned to permit attachment of the strut 67 with the hull 23. When in the parked condition, the boat 21 can be easily maneuvered as desired on its three-wheel support.

When it is desired to hitch the boat 21 to the towing vehicle 37 from the parked condition, the cable 59 is again attached to the boat hull, the latch lever 75 is depressed to disconnect the strut 67 from its fixed engagement with the boat hull 23, and the winch 57 is operated to permit lessening of the vertical distance between the pivot tube 47 and the coupling element 33, thereby swinging the coupling element 33 upwardly relative to the ground and permitting lowering of the bow 31. When the coupling element 33 is sufficiently raised to permit entry thereunder of the mating coupling component 35, the winch 57 is then operated to lower the coupling element 33 onto the coupling component 35. Subsequent operation of the winch 57 returns the hitch bar 27 to a position affording attachment of the strut 67 to the boat hull 23. In this condition, as seen in FIGURE 3, the parking wheel 39 can be elevated from the ground and readily shifted to its folded position.

Various of the features of the invention are set forth in the following claims.

What is claimed is:

1. The combination in a vehicle of a frame, means including a pair of wheels for supporting said frame for pivotal movement relative to a supporting surface about an axis extending transversely of said frame, a hitch bar including at one end thereof means facilitating support of said one end of said hitch bar at selected predetermined levels above the supporting surface, means on an end of said frame spaced from said transverse axis mounting the other end of said hitch bar for vertical displacement of said one end of said hitch bar relative to said end of said frame, and means on said vehicle for connecting a selected point on said hitch bar spaced from said hitch bar mounting means and a selected point on said frame spaced from and below said hitch bar mounting means and for adjustably varying the distance between said connected points to vertically displace said one end of said hitch bar relative to said end of said frame, whereby, when said one end of said hitch bar is supported at a predetermined level, vertical displacement between said one end of said hitch bar and said end of said frame results in tilting of said vehicle about said pair of wheels.

2. A combination in accordance with claim 1 wherein said means mounting the other end of said hitch bar comprises
   a horizontal pivot affording vertical swinging of said hitch bar, whereby when said one end of said hitch bar is supported at said predetermined level, variation in the angle between said hitch bar and a line joining said hitch bar mounting means and said frame supporting means results in the tilting of said frame about said pivotal support means.

3. A combination in accordance with claim 2 wherein said means for connecting said points and for varying the distance between said points comprises winch means mounted on a selected one of said frame and said hitch bar, whereby said winch means is operable to tilt said frame by elevating said hitch bar mounting means when said one end of said hitch bar is supported at a predetermined height above the supporting surface.

4. A combination in accordance with claim 1 wherein said means for facilitating support of said one end of said hitch bar comprises
   a coupling element adapted to be connected to a complementary coupling component located at a predetermined point above the supporting surface on a towing vehicle.

5. A combination in accordance with claim 1 wherein said means facilitating support of said one end of said hitch bar comprises
   a parking member extending from said hitch bar for engagement with the supporting surface, said parking member including a downwardly facing convex end surface adapted for rocking engagement with the supporting surface.

6. A combination in accordance with claim 1 including a brace element connectable between said hitch bar and said frame when said one end of said hitch bar is supported at a predetermined height above the supporting surface and at a given vertical displacement below said hitch bar mounting means, thereby to relieve loading on said means for connecting said points and varying the distance between said one end of said hitch bar and said points.

7. A boat including a hull, a pair of wheels, means mounting said wheels on said hull for movement between retracted positions generally within said hull and extending positions at least partially beneath said hull, whereby when said wheels are in extended position, said hull is pivotal relative to a supporting surface, a hitch bar including at one end thereof means facilitating support of said one end of said hitch bar at selected predetermined levels above the supporting surface, means on said hull spaced from said wheels mounting the other end of said hitch bar for vertical movement of said one end of said hitch bar relative to said hitch bar mounting means, and means on said boat for connecting a selected point on said hitch bar spaced from said hitch bar mounting means and a selected point on said hull spaced from, and below, said hitch bar mounting means and for adjustably varying the distance between said connected points to vertically displace said one end of said hitch bar relative to said hitch bar mounting means whereby, when said one end of said hitch bar is supported at a predetermined level, vertical displacement between said one end of said hitch bar and said hitch bar mounting means results in tilting of said hull about said wheels.

8. The combination in a boat of a hull, wheel means for supporting said hull for pivotal movement relative to a supporting surface, a hitch bar including at one end thereof means facilitating support of said one end of said hitch bar at selected generally predetermined levels above the supporting surface, means mounting the other end of said hitch bar to an end of said hull spaced from said wheel means for movement of said hitch bar relative to a storage position in said hull and for vertical movement of said one end of said hitch bar relative to said end of said hull when said hitch bar is displaced from said storage position, means on said boat for connecting a selected point on said hitch bar spaced from said hitch bar mounting means and a selected point on said hull spaced from, and below, said hitch bar mounting means and for adjustably varying the distance between said connected points to vertically displace said one end of said hitch bar relative to said hitch bar mounting means whereby, when said one end of said hitch bar is supported at a predetermind level, vertical displacement between said one end of said hitch bar and said hitch bar mounting means results in tilting of said hull about said wheel means.

9. The combination in a boat of a hull including a bow having therein a storage chamber and a top deck including a removable hatch affording access to said chamber, wheel means for supporting said hull for pivotal movement relative to a supporting surface, a hitch bar including at one end thereof a coupling element adapted to be connected to a complementary coupling component located at a predetermined point above the supporting surface on a towing vehicle, a parking member including a downwardly facing convex end surface, and means for mounting said parking member on said hitch bar for movement between a retracted position and a position adapted for engagement of said end surface with the supporting surface, a horizontal pivot disposed adjacent to said top deck at the bow of said hull and connected to the other end of said hitch bar to permit vertical swinging of said hitch bar about said bow from a storage position in said chamber to a range of positions extending forwardly of said bow with said one end of said hitch bar being disposable at varying vertical displacements relative to said horizontal pivot when said hitch bar is displaced from said storage position, winch means mounted so as to vary the distance between a given point on said hitch bar and a given point on said hull spaced below said hitch bar mounting means, whereby said winch means is operable, when said one end of said hitch bar is supported at a predetermined level, to elevate said pivot relative to said one end of said hitch bar, thereby pivoting said hull about said wheel means, and a brace connectable, when said one end of said hitch bar is disposed at a given vertical displacement relative to said pivot, between said hitch bar and a point on said hull below said pivot, thereby to relieve loading on said winch means.

10. The combination in a boat of a hull including a storage chamber in the bow of said boat, a top deck including a removable hatch affording access to said chamber, a horizontal pivot disposed adjacent to said top deck in the bow of said boat, wheel means for supporting said hull for pivotal movement relative to a supporting surface, a hitch bar including at one end of thereof means facilitating support of said one end of said hitch bar at selected, generally predetermined levels above the supporting surface, means connecting the other end of said hitch bar to said pivot for movement of said hitch bar relative to a storage position in said storage chamber and for vertical movement of said one end of said hitch bar relative to the bow of said boat when said hitch bar is displaced from said storage position, means on said boat for connecting a selected point on said hitch bar spaced from said pivot connecting means and a selected point on said hull spaced from, and below, said pivot and for adjustably varying the distance between said connected points to vertically displace said one end of said hitch bar relative to said pivot connecting means whereby, when said one end of said hitch bar is supported at a predetermined level, vertical displacement between said one end of said hitch bar and said pivot connecting means results in titlting of said hull about said wheel means.

11. The combination in a vehicle of a frame including a storage area adjacent to one end thereof, means including a pair of wheels spaced from said one frame end for supporting said frame for pivotal movement relative to a supporting surface about an axis extending transversely of said frame, a hitch bar including at one end thereof means facilitating support of said one hitch bar end at selected predetermined levels above the supporting surface, means on said one frame end mounting the other end of said hitch bar for pivotal movement of said hitch bar about a transverse axis to and from a position in said storage area and positions extending outwardly from said one frame end, and means on said vehicle for connecting, when said hitch bar extends outwardly, a selected point on said hitch bar spaced from said hitch bar mounting means and a selected point on said frame spaced from and below said hitch bar mounting means and for adjustably varying the distance between said connected points to vertically displace said one hitch bar end relative to said one frame end whereby, when said one hitch bar end is supported at a predetermined level, vertical displacement between said one hitch bar end and said one frame end results in tilting of said vehicle about said pair of wheels.

12. A combination in accordance with claim 9 including a unitary fitting on said hull at a point below the pivotal mounting of said hitch bar, said fitting including
    means connectable with said winch means, and
    means releasably engageable with said brace when the outer end of said hitch bar is disposed at said given vertical displacement relative to said hitch bar mounting means.

13. A combination in accordance with claim 9 wherein said hitch bar includes, at said other end, two members diverging in the direction toward said mounting means, and
    said winch means is mounted on said hitch bar and includes a cable which, when connected to said given point on said hull, passes between said divergent members.

14. A combination in accordance with claim 8 wherein said means facilitating support of said one end of said hitch bar includes
    a support member, and
    means mounting said support member on said hitch bar adjacent said one hitch bar end for selective disposition in either of a load carrying position and a retracted position in generally parallel relation to the adjacent part of said hitch bar.

References Cited in the file of this patent
UNITED STATES PATENTS

| | | |
|---|---|---|
| 2,393,016 | Black | Jan. 15, 1946 |
| 2,502,309 | Byrd | Mar. 28, 1950 |
| 2,718,431 | Pietroroia | Sept. 20, 1955 |
| 2,810,588 | Rozett | Oct. 22, 1957 |
| 2,833,562 | Francois | May 6, 1958 |
| 2,953,266 | Anderson | Sept. 20, 1960 |
| 2,953,396 | Meadows | Sept. 20, 1960 |
| 2,954,569 | McCord | Oct. 4, 1960 |
| 3,084,954 | Schlueter | Apr. 9, 1963 |

UNITED STATES PATENT OFFICE
CERTIFICATE OF CORRECTION

Patent No. 3,158,881            December 1, 1964

Kenneth E. Clausen

It is hereby certified that error appears in the above numbered patent requiring correction and that the said Letters Patent should read as corrected below.

Column 2, lines 36 and 37, for "FIGURE" read -- FIGURE 1 --; column 3, line 5, for "whel" read -- wheel --.

Signed and sealed this 4th day of May 1965.

(SEAL)
Attest:

ERNEST W. SWIDER
Attesting Officer

EDWARD J. BRENNER
Commissioner of Patents